United States Patent [19]
Schulz

[11] Patent Number: 6,059,543
[45] Date of Patent: May 9, 2000

[54] PUMP APPLIANCE, IN PARTICULAR FOR A TANK SYSTEM OF AN INTERNAL COMBUSTION ENGINE

[75] Inventor: Wolfgang Schulz, Bietigheim-Bissingen, Germany

[73] Assignee: Robert Bosch GmbH, Stuttgart, Germany

[21] Appl. No.: 08/443,301

[22] Filed: May 17, 1995

[30] Foreign Application Priority Data

Jun. 16, 1994 [DE] Germany ............................. 44 20 960

[51] Int. Cl.⁷ .................................................. F04B 43/06
[52] U.S. Cl. .......................................................... 417/395
[58] Field of Search ..................... 417/394, 395

[56] References Cited

U.S. PATENT DOCUMENTS 3,294,030 12/1966 Fox ...................................... 417/395 X
4,551,076 11/1985 DuBois .................................... 417/395

FOREIGN PATENT DOCUMENTS 9415090 7/1994 WIPO .
9427131 11/1994 WIPO .

OTHER PUBLICATIONS

4. Aachener Kolloquium, Fahrzeug–und Motorentechnik, 1993, Seiten 467 bis 477, Verfasser: Dr.–Ing. H. Stocker, Dr.–Ing. M. Constien.

Primary Examiner—Charles G. Freay
Attorney, Agent, or Firm—Edwin E. Greigg; Ronald E. Greigg

[57] ABSTRACT

Known tank systems have an adsorption filter in order to accept degassing constituents of the fuel in a fuel tank. Such tank systems have to be tested for leaks and a pump appliance is provided for this purpose. The pump appliance is fitted to a ventilation conduit of the adsorption filter in order to supply a defined volume to the tank system so that an increase in pressure in the tank system is effected. In order to determine whether the tank system is pressure-tight, ample time is left after the pressure build-up in order that, if pressure decays, the conclusion can be drawn that there is a leak. The pump appliance according to the invention possesses an electromagnetic valve which has a vacuum connection connected to an induction pipe of an internal combustion engine in order to adjust, alternately, vacuum and ambient pressure in a pump space so that the pressure forces move a pump diaphragm in order to pump air into a ventilation conduit of an adsorption filter. During the pump procedure, it is necessary to ventilate the electromagnetic valve and this takes place, in accordance with the invention, by means of a ventilation opening leading directly to the surroundings. The pump appliance according to the invention is provided, in particular, for a tank system of an internal combustion engine.

3 Claims, 6 Drawing Sheets

PUMP APPLIANCE, IN PARTICULAR FOR A TANK SYSTEM OF AN INTERNAL COMBUSTION ENGINE

PRIOR ART

The invention is based on a pump appliance, in particular for a tank system of an internal combustion engine, having an integrated electromagnetic valve. A pump appliance is already known (4th Aachen Colloquium, Fahrzeug- und Motorentechnik '93 (Vehicle and Engine Technology '93), pages 467 to 477, authors: Dr.-Ing. H. Stocker, Dr.-Ing. M. Constien) which is provided for leak testing of the tank system by supplying a defined volume to the tank system via a ventilation conduit of an adsorption filter so that an increase in pressure is effected in the tank system. In order to determine whether the tank system is pressure-tight, ample time is left after the pressure build-up in the tank system has been concluded, in order that, if the pressure decays, the conclusion can be drawn that there is a leak in the tank system, the time elapsing during the decay of pressure being a measure of the size of the leak. In addition, the tank system includes a fuel tank connected to the adsorption filter and a regenerating valve connected between the adsorption filter and an induction pipe of the internal combustion engine.

The pump appliance represented in FIG. 7 on page 476 of the prior art quoted at the beginning has a switching valve, which is configured in the form of an electromagnetic valve and which is connected to the induction pipe of the internal combustion engine by means of a vacuum connection and to the surroundings by means of a hose conduit which has an ambient air filter. Switching the switching valve causes the pump appliance pump space, which is bounded by a pump diaphragm and the switching valve, to be alternately subjected to vacuum from the induction pipe and to ambient pressure so that the pump diaphragm moves downwards and upwards. When the pump space is subjected to vacuum, the pump diaphragm moves against the compression force of a pump spring, upwards in FIG. 7, ambient air flowing into a delivery space through an ambient air filter (not shown in any more detail in FIG. 7) via a supply conduit. The delivery space provided is opposite to the pump space and is closed off by the pump diaphragm and two non-return valves. When the pump space is ventilated, or subjected to ambient pressure, the pump diaphragm moves downwards, supported by the compression force of the pump spring, the ambient air enclosed in the pump space being compressed in the delivery space when the non-return valves are closed. When a certain positive pressure in the delivery space is reached, the non-return valve shown on the right in FIG. 7 opens so that the compressed ambient air can flow via a delivery conduit into the ventilation conduit of the adsorption filter.

The pump diaphragm is, furthermore, connected to a push-rod so that the motion of the pump diaphragm controls a shut-off valve, which is shown below the pump diaphragm in FIG. 7. In consequence, this shut-off valve only shuts off a connection of the ventilation conduit of the adsorption filter, or of the delivery conduit to the supply conduit, during the pumping phase and only when the pump diaphragm is moved; it frees the delivery conduit to the surroundings when the switching valve is without current, or when the pump diaphragm is not moved. Because ambient air flows into the pump space each time the system switches from vacuum to ambient-pressure, the switching valve is ventilated by means of a ventilation conduit provided which, as can be seen from FIG. 7, is configured in the form of a hose. The hose is usually manufactured from plastic and leads around the housing of the pump appliance from the switching valve to the shut-off valve. A relatively long hose of this type does, however, have the disadvantage that it can leak, particularly at its connecting points because, for example, of ageing phenomena. If the hose leaks, however, the functional reliability of the pump appliance is endangered because unfiltered ambient air can then be induced directly into the switching valve so that deposits can form due to unfiltered ambient air. The danger also exists that the hose manufactured from plastic can leak due to brittleness at low ambient temperature, particularly at its connecting points. In addition, careful assembly is necessary during the manufacture of the pump appliance in order, in particular, to exclude kinking of the hose. Furthermore, a leak test of the hose connection is necessary after the hose has been fitted so that high production costs are to be expected, particularly in the case of mass production of the pump appliance.

ADVANTAGES OF THE INVENTION

The pump appliance according to the invention has—in contrast—the advantage that the hose necessary on the switching valve in the prior art disappears so that the pump appliance according to the invention can be manufactured in a particularly low-cost manner, particularly in mass production, and has increased functional reliability compared with the prior art. The pump appliance according to the invention advantageously possesses a particularly compact construction so that it is particularly suitable in the case of restricted installation conditions such as occur in the engine compartment of a motor vehicle.

Advantageous further developments and improvements to the pump appliance given in claim 1, or in claim 5, are possible by means of the measures listed in the sub claims.

BRIEF DESCRIPTION OF THE DRAWINGS

Embodiment examples of the invention are shown in a simplified manner in the drawing and are explained in more detail in the following description.

FIG. 3 shows a section along the line III—III in FIG. 2a/2b and FIG. 4a/4b shows a sectional representation of the pump appliance according to the invention and according to a second embodiment example.

DETAILED DESCRIPTION OF THE EMBODIMENT EXAMPLES

Figure 1:
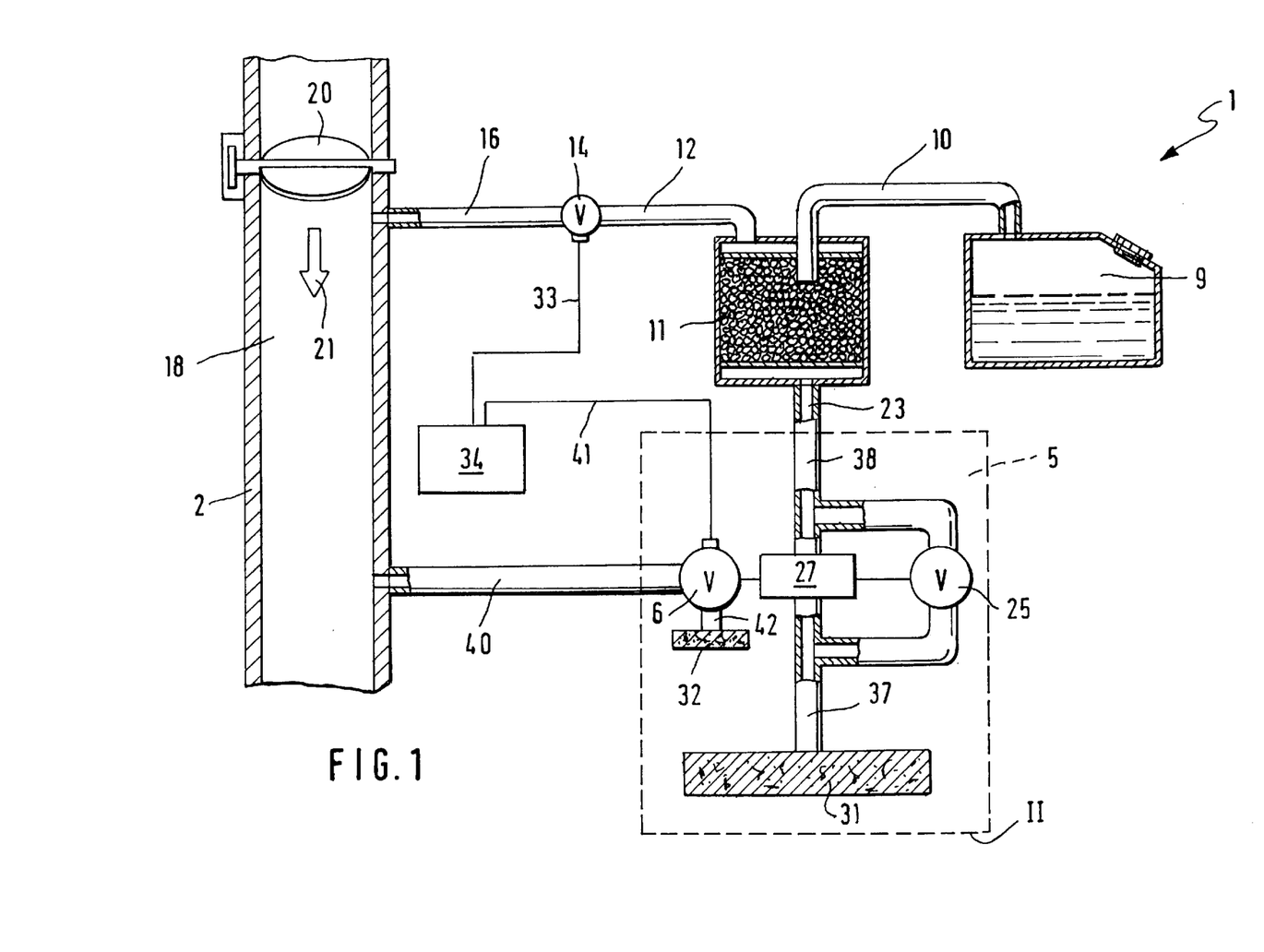
FIG. 1 shows a schematic diagram of an internal combustion engine tank system.

FIG. 1 shows a tank system, indicated by 1, of an internal combustion engine 2 (not shown in any more detail) which is equipped with a pump appliance 5 shown within the line II in a simplified functional representation. In addition, the tank system 1 includes a fuel tank 9 which is used to supply the internal combustion engine 2 with fuel and which is connected to an adsorption filter 11 via a tank conduit 10. The adsorption filter 11 is partially filled with an adsorption medium, in particular with active carbon, and is connected via a connecting conduit 12 to a regenerating valve 14 which is in turn connected via a valve conduit 16 to an induction pipe 18 of the internal-combustion engine 2. The valve conduit 16 emerges downstream of a throttle butterfly 20, which is rotatably introduced into the induction pipe 18 of the internal combustion engine 2. A fuel/air mixture flows in the induction pipe 18 in the direction of an arrow 21 which is drawn in the figure. When the internal combustion engine 2 is in operation, there is a vacuum in the induction pipe 18 and this is used to extract the fuel vapors from the fuel tank 9 when the regenerating valve 14 is open. In this process, the fuel vapors pass from the fuel tank 9 via the tank conduit 10 into the adsorption filter 11 and from the latter into the connecting conduit 12, ambient air being induced via a ventilation conduit 23 of the adsorption filter 11 because of the vacuum in the induction pipe 18 so that the fuel temporarily stored in the adsorption filter 11 is entrained.

The fuel vapors stored in the adsorption filter 11 mix with the ambient air flowing in via the ventilation conduit 23 and the fuel vapors are then introduced into the induction pipe 18 via the regenerating valve 14 and the valve conduit 16. These vapors then burn in at least one combustion space of the internal combustion engine. During this process, an electronic control unit 34, which is connected to the regenerating valve 14 by means of an electrical control line 33, ensures that the introduction of the fuel vapors only takes place in selected operating ranges of the internal combustion engine so that, on the one hand, the exhaust emissions of the internal combustion engine are not increased and, on the other, smooth running of the internal combustion engine is ensured.

Figure 2A:
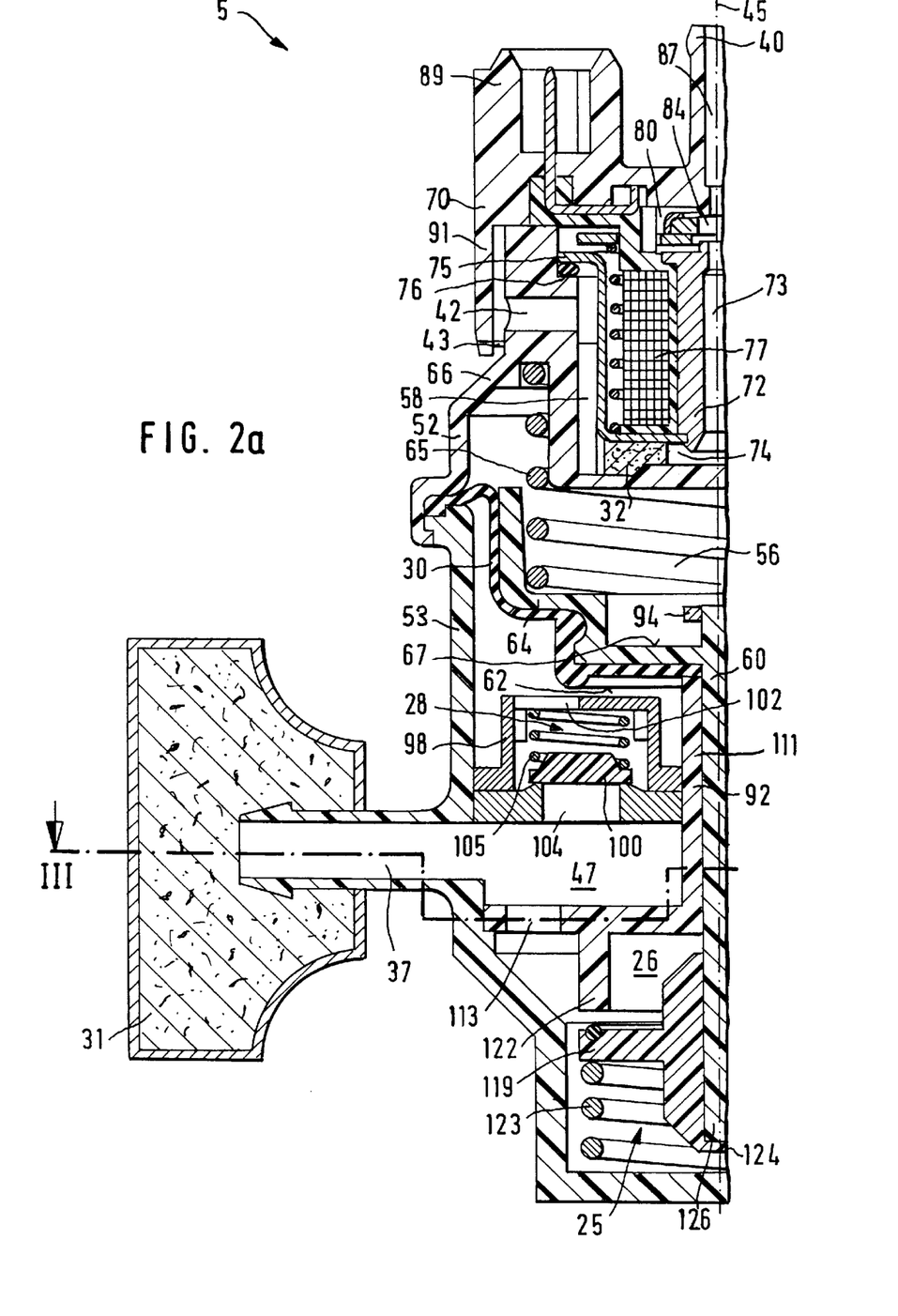
FIG. 2a/2b shows a sectional representation of the pump appliance according to a first embodiment.
Figure 2B:
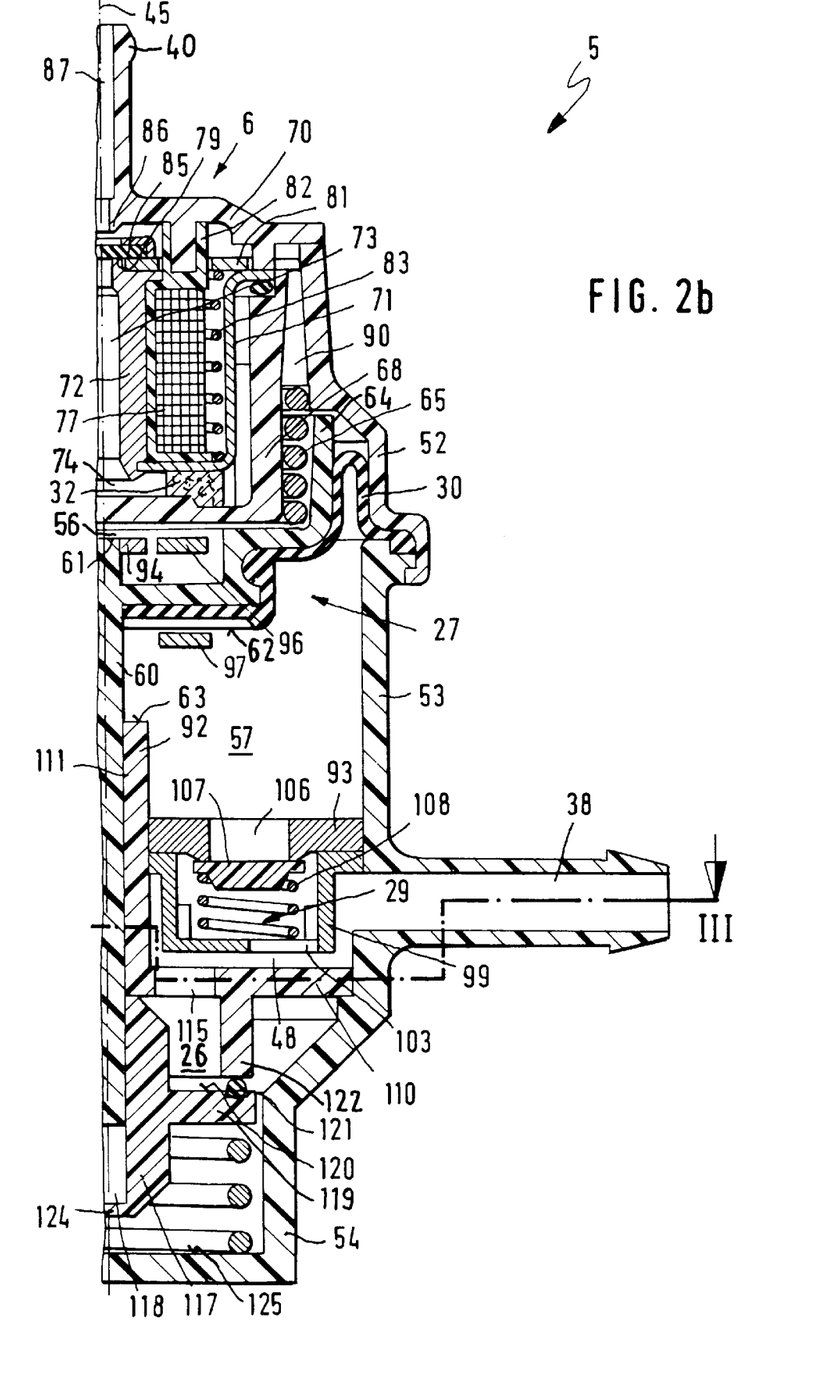

The pump appliance 5 according to the invention and shown in FIG. 2a/2b, is provided on the ventilation conduit 23 of the adsorption filter 11 and is composed of the functionally separated individual components represented within the line II in FIG. 1. These individual components essentially include a switching valve in the form of an electromagnetic valve 6, a shut-off valve 25, a pump part 27 with a pump diaphragm 30 and non-return valves 28 and 29, an ambient air filter 31 and a pump filter 32. The pump appliance 5 is provided for leak testing the tank system 1 and during this procedure, a defined volume is supplied to the tank system 1 by means of the pump appliance 5 when the regenerating valve 14 is closed so that an increase in pressure takes place in the tank system 1. After the build-up of pressure in the tank system 1, ample time is left until, possibly, this pressure build-up decays again because of a leak in the tank system 1, the time elapsed until the pressure has decayed being a measure of the size of the leak. This leak test for the tank system 1, also referred to as the positive pressure method, makes it possible to ascertain leakage openings of an order of value of less than 1 mm diameter. Possible difficulties due to different fuel levels in the fuel tank 9 are advantageously avoided by means of a compensation effect. The positive pressure necessary for checking purposes is provided by the pump appliance 5 according to the invention. This pump appliance 5 induces ambient air via the ambient air filter 31 into a supply conduit 37 of the pump appliance 5 during the pumping process and then pumps this air at an increased pressure into a delivery conduit 38 of the pump appliance 5, this delivery conduit 38 being connected to the ventilation conduit 23 of the adsorption filter 11. The pump part 27 is provided for compressing the ambient air and includes a pump space 56 which is closed off by the pump diaphragm 30 and two non-return valves 28 and 29. The pump part 27 is indirectly driven by means of a vacuum source by switching a vacuum connection 40 of the electromagnetic valve 6, the vacuum connection 40 being configured in the form of a hose conduit which leads from the electromagnetic valve 6 to the induction pipe 18 downstream, for example, of the throttle butterfly 20. During the operation of the pump appliance 5, or of the pump part 27, the shut-off valve 25, which is connected in parallel with the non-return valves 28 and 29 between the supply conduit 37 and the delivery conduit 38, takes up a closed position in order to interrupt a connection between the supply conduit 37 and the delivery conduit 38. If operation of the pump appliance 5 (or leak testing of the tank system 1) is not desired, the shut-off valve 25 is held in an open position in which the supply conduit 37 is connected to the delivery conduit 38 so that during the regeneration of the adsorption filter 11, ambient air from the ambient air filter 31 can flow via the supply conduit 37 into the delivery conduit 38 and from the latter into the ventilation conduit 23. The electromagnetic valve 6 is connected by means of an electrical control line 41 to the electronic control unit 34 so as, during the leak testing, to appropriately activate the pump appliance 5, and the electromagnetic valve 6, at certain intervals— each time the internal combustion engine 2 is started, for example.

The construction and the function of the individual components of the pump appliance 5, which components are diagrammatically represented within the line II in FIG. 1, are described in more detail below using FIG. 2a/2b, which shows a section through the pump appliance 5 according to the invention. The pump appliance 5 has an upper housing half 52 and a lower housing half 53, both of which are manufactured from plastic, for example. They are connected together by means of ultrasonic welding. A movable wall in the form of an elastic pump diaphragm 30 is clamped at its periphery between the overlapping housing halves 52 and 53. The pump diaphragm 30 separates a pump space 56 from an opposite delivery space 57. The delivery space 57 is bounded, on the one hand, by the pump diaphragm 30 and, on the other, by two non-return valves 28 and 29, the non-return valve 28 being represented in FIG. 2a to the left of a longitudinal center line 45 symmetrically dividing the pump appliance 5 and the non-return valve 29 being represented in FIG. 2b to the right of the longitudinal center line 45. The pump appliance 5 and the pump diaphragm 30 are respectively shown in the non-excited condition of the electromagnetic valve 6 in FIG. 2a whereas the pump appliance 5 and the pump diaphragm 30 are respectively represented in the excited condition of the electromagnetic valve 6 in FIG. 2b. A spring plate 64 is arranged on the pump diaphragm 30 on the side of the pump diaphragm 30 facing towards the electromagnetic valve 6 and, as is shown in FIG. 2a/2b, this spring plate 64 has a push-rod 60 oriented centrally relative to the longitudinal center line 45 and connected to the spring plate 64 or formed integrally on it. The spring plate 64 is used to provide the pump diaphragm 30 with a certain stiffness, on the one hand, and to support a pump spring 65, on the other. This pump spring 65 is in contact with the spring plate 64 and with an end 66 of the upper housing half 52.

The electromagnetic valve 6 is arranged on the end facing away from the pump space 56 of a dome 68 of the end 66, which dome 68 protrudes partially into the pump space 56, and the electromagnetic valve 6 is closed towards the outside by a cap 70. The electromagnetic valve 6 has a cup-shaped valve housing 71 made from magnetically conducting material and a core 72 of tubular configuration is riveted, for example, in this valve housing 71. A passage hole 73 is provided in the core 72 and ends in a flow passage 74 which is formed between the dome 68 and the valve housing 71 and is in connection with the atmosphere via a ventilation opening 42, configured in accordance with the invention and leading directly to the surroundings. The ventilation opening 42 is cut out of the dome 68 in the form of a hole which extends transversely to the longitudinal center line 45, for example; it leads directly from the surroundings into an intermediate space 58 formed in the shape of an annular gap between the dome 68 and the valve housing 41. In order to reduce the danger of dirt accumulating, a projection 91 of the cap 70 overlaps the ventilation opening 42 at a radial distance. In addition, the projection 91 has, for example, individual protrusions 43 which partially extend radially from the projection 91 to the upper housing half 52 downstream of the ventilation opening 42. In addition to the configuration of a projection 91, the ambient air flowing into the flow passage 74 can be filtered by a pump filter 32 of annular configuration which is, for example, arranged between the dome 68 and the valve housing 71. The pump filter 32 is configured, for example, in the form of an extremely low-cost felt seal for filtering the ambient air flowing via the ventilation opening 42 into the intermediate space 58 and from there into the flow passage 74 in order to avoid, in particular, dirt accumulating in the region of a first valve seat 79 and in the region of a second valve seat 86 of the electromagnetic valve 6.

Within the valve housing 71, the core 72 is surrounded by a magnet winding 77. The core 72 has a shoulder, configured as a first valve seat 79, protruding from the magnet winding 77. The passage hole 73 of the core 72 opens, via the first valve seat 79, into a space 80 formed between the valve housing 71 and the cap 70. A flat armature 81 formed in plate shape is arranged in the space 80 opposite to the core 72 and this flat armature 81 is guided in the axial direction of the valve by means of guide spigots 82. A compression spring 83 is provided which is coaxial with the magnet winding 77 and arranged between the latter and the valve housing 71 and this compression spring 83 is supported on the valve housing 71, at one end, and on the flat armature 81, at the other. In the region of its first valve seat 79, the flat armature 81 has an opening 84 into which the annular first valve seat 79 protrudes. The opening 84 is covered by a sealing element 85, for example a flat rubber part, which is connected to the flat armature 81 and is located on the side of the flat armature 81 facing away from the first valve seat 79. The second valve seat 86 facing towards the sealing element 85 of the flat armature 81 is provided in the cap 70. A flow hole 87 of the vacuum connection 40 (which is connected to the induction pipe 18) of the electromagnetic valve 6 opens into the second valve seat 86.

The valve housing 71 has a yoke 75 which is in contact via an intermediate seal with a collar 76 of the end 66 so that the intermediate space 58 is separated from the space 80. The space 80 is in connection with the pump space 56 via a flow passage 90 formed in the end 66. The delivery space 57 is bounded, on the one hand, by the pump diaphragm 30, and on the other, by a disk-shaped non-return valve holder 93 of the non-return valves 28 and 29. The non-return valve holder 93 is firmly connected to the lower housing part 53 and has, symmetrical about the longitudinal center line 45, a left-hand non-return valve opening 104 represented to the left of the longitudinal center line 45 and a right-hand non-return valve opening 106, represented to the right of the longitudinal center line 45. A guide sleeve 92 centered on the longitudinal center line 45 is connected to the non-return valve holder 93 between the two non-return valve openings 104 and 106 and the push-rod 60 is accommodated in the guide sleeve 92 so that it can be axially displaced. The push-rod 60 protrudes somewhat out of an end surface 67, facing towards the electromagnetic valve 6, of the spring plate 64 and has a contact part, for example a magnet ring 94 or a coil with current flowing through it, on its end section 61 arranged in the pump space 56. The magnet ring 94 or the coil is necessary to actuate a so-called reed switch, which is known to the specialist. The reed switch is composed of magnetic contacts which are, for example, melted into a glass tube and actuated by a magnetic field of a permanent magnet, the magnet ring 94 in the embodiment example, or an electromagnet formed by the coil. Two reed switches, 96 and 97, are provided in the embodiment example and, as is shown in FIG. 2b, a first reed switch 96 is accommodated in the pump space 56 and, below this, a second reed switch 97 is accommodated in the delivery space 57. The reed switches 96 and 97 are actuated by the push-rod 60 with the aid of the magnet ring 94 when the end section 61 of the push-rod 60, together with the magnet ring 94, comes into the immediate vicinity of a reed switch 96 or 97. The two reed switches 96 and 97 are connected directly, for example, to the electromagnetic valve 6 by means of electric lines (not shown in any more detail) so that the electromagnetic valve 6 can be switched into an excited condition or into a non-excited condition. It is also possible to connect the two reed switches 96 and 97 to the electronic control unit 34 in order to supply the electrical switching pulses of the reed switches 96 and 97 directly to the control unit 34 so that the latter can activate the electromagnetic valve 6. The pump appliance 5 has an electrical plug 89 which is used for the electrical supply to the electromagnetic valve 6 and, for example, for connecting the electronic control unit 34. The plug 89 is provided on the cap 70 and has, for example, a three-pole configuration. Electrical lines, which are not shown in any more detail and which lead from the lower housing half 53 to the upper housing half 52 and to the electromagnetic valve 6 and to the plug 89, are provided for connecting the reed switches 96 and 97 to the electromagnetic valve 6 and, for example, to the plug 89. The pump diaphragm 30 is shown in its highest position in FIG. 2b and in its lowest position in FIG. 2a. The working range of the pump diaphragm 30, which corresponds approximately to the axial distance between the two reed switches 96 and 97, is fixed between the lowest and highest positions of the pump diaphragm 30. It is also possible to provide other means for recording the current position of the pump diaphragm 30. As an example, the end section 61 of the push-rod 60 can have a contact pin which, when leaving the working range of the pump diaphragm 30, makes electrical contact with appropriately attached pick-ups which are axially at a distance apart.

The non-return valve 28 shown on the left in FIG. 2a has a cup-shaped top 98 within which a disk-shaped valve closing element 100 is introduced. The top 98 is located within the delivery space 57 and has an opening 102 for connecting an internal space of the top 98 to the delivery space 57. The valve closing element 100 is supported against an internal wall of the top 98 on a compression spring 105 so that the non-return valve opening 104 to the supply conduit 37, which is provided in the non-return valve holder 93, closes when there is a positive pressure in the delivery space 57 and opens when there is a vacuum in the delivery space 57. The right-hand non-return valve 29 shown in FIG. 2b on the right of the longitudinal center line 45 is constructed to correspond with the left-hand non-return valve 28 and a cup-shaped right-hand top 99 protrudes into the delivery conduit 38. The right-hand top 99 has an opening 103 which connects an internal space of the right-hand top 99 to the delivery conduit 38. A disk-shaped valve closing element 107 is accommodated in the internal space of the right-hand top 99 and this closes the non-return valve opening 106 in the non-return valve holder 93 and opens it when the pressure in the delivery space 57 is higher than the pressure in the delivery conduit 38. The right-hand valve closing element 107 is supported against a compression spring 108 which is in contact with the top 99 and is accommodated in the internal space of the right-hand top 99. Both compression springs 105 and 108 have a relatively low spring constant so that both non-return valves 28 and 29 can be actuated with a low pressure force so as to permit rapid opening and closing of the non-return valves 28 and 29 with only an extremely small flow resistance.

Figure 3:
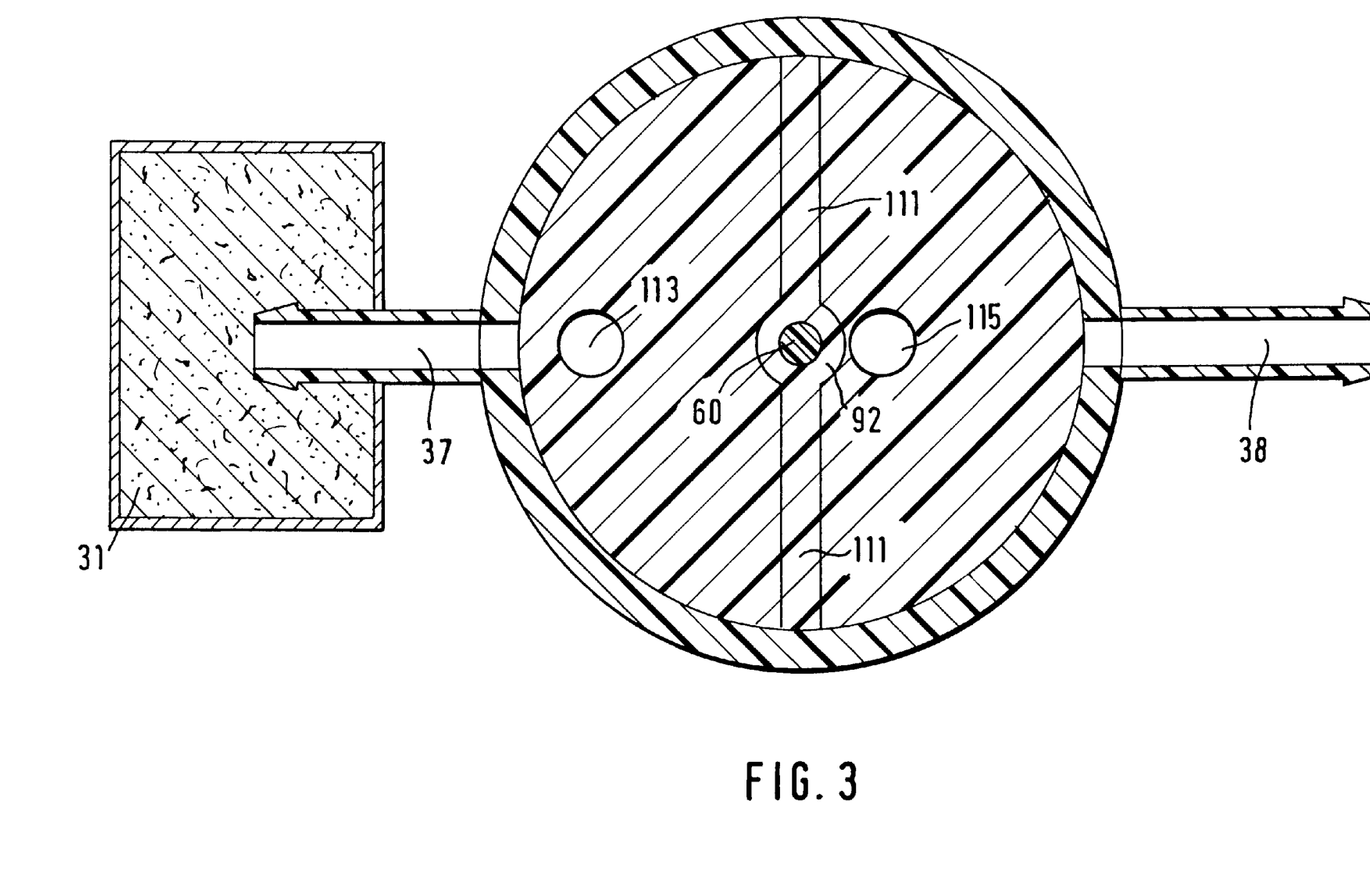

As is shown in FIG. 3, which is a section along the line III—III in FIG. 2a/2b, a radial separating protrusion 111 is formed integrally on the guide sleeve 92 and this divides an axial space formed between a separating disk 110 and the non-return valve holder 93 into an induction space 47 located to the left of a longitudinal center line 45 in FIG. 2a and into the positive pressure space 48 located to the right of the longitudinal center line 45 in FIG. 2b and closes off the induction space 47 from the positive pressure space 48 in a pressure-tight manner. The separating disk 110 bounds a part 54 of cup-shaped configuration in the lower housing half 53 in which the shut-off valve 25 is accommodated. The induction space 47 is connected by means of an opening 113 in the separating disk 110 to an internal space 26 of the shut-off valve 25 and the positive pressure space 48 is connected by means of an opening 115 in the separating disk 110 to this internal space 26 of the shut-off valve 25. The push-rod 60 protrudes into the internal space 26 of the shut-off valve 25 and a sleeve-shaped closing element 117 is fitted to the second end section 126, opposite to the end section 61, of the push-rod 60. The closing element 117 has a central recess 118 in which the push-rod 60 is accommodated so that it can be axially displaced. In addition, the closing element 117 has an annular closing part 119 and a sealing ring 121 is inserted, in a peripheral annular groove surface for example, on the end surface 120, of the annular closing part 119, facing towards the separating disk 110. When the closing element 117 is closed, the sealing ring 121 is in contact with a sleeve-shaped extension 122 formed on the separating disk 110. The opening 115 is located radially within the sleeve-shaped extension 122 and therefore connects the internal space 26 located within the sleeve-shaped extension 122 to the positive pressure space 48. When the sealing ring 121 is in contact with the extension 122, therefore, a flow connection from the positive pressure space 48 to the opening 113 located outside the extension 122, and therefore to the internal space 26 and to the induction space 27, is interrupted. The closing part 119 of the closing element 117 is acted on by a compression spring 123 which is supported on the closing part 119 and on an end 125 of the lower housing half 53 and acts, in the closing direction, on the closing part 119 in the direction towards the extension 122. The recess 118 of the closing element 117 is bounded by a transverse wall 124. When the electromagnetic valve 6 is not excited, the pump spring 65 displaces the spring plate 64, and therefore the push-rod 60, into its lowest position in which its end section 126 is in contact with the transverse wall 124 and raises the closing element 117 in the opening direction from the extension 122 against the force of the compression spring 123. In the pumping phase of the pump appliance 5, the end section 126 of the push-rod 60 has been raised from the transverse wall 124 in such a way that the closing part 119 is pressed onto the extension 122 by the compression spring 123 so that the shut-off valve 25 is closed.

The mode of operation of the pump appliance 5 is outlined below. When the electromagnetic valve 6 is not excited, the flat armature 81 is displaced in the direction of the second valve seat 86 because of the force of the compression spring 83 so that the sealing element 85 closes the valve seat 86. In this position, shown in FIG. 2a, ambient air can flow via the ventilation opening 42 to the first valve seat 79 and from there into the space 80, the flow passage 90 and into the pump space 56. During this process, the pump diaphragm 30 is moved downwards, with the assistance of the pump spring 65, in the direction of an end surface 63 of the guide sleeve 92. However, before the pump diaphragm 30 reaches its lowest position, in which an end surface 62—of the pump diaphragm 30—facing away from the end surface 67 of the spring plate 64 is in contact with an end surface 63—of the guide sleeve 92—facing towards the end surface 62, the electromagnetic valve 6 is excited by the lower, second reed switch 97 being switched over. When the electromagnetic valve 6 is excited, the flat armature 81 is attracted to the core 72 so that the sealing element 85 closes the first valve seat 79 and frees the second valve seat 86. Subsequently, when the second valve seat 86 is open, air can flow away from the pump space 56 to the induction pipe 18 via the flow passage 90, the space 80, the second valve seat 86 and the vacuum connection 40 of the electromagnetic valve 6 so that a decrease in pressure is experienced in the pump space 56. The result of the decrease in pressure in the pump space 56 is that the pressure forces acting on the pump diaphragm 30 effect a reversal of motion of the pump diaphragm 30, the latter being pressed upwards by the pressure in the delivery space 57, against the force of the pump spring 65, until the upper, first reed switch 96 is actuated and therefore de-excited. At the end of the excited condition of the electromagnetic valve 6, the flat armature 81 and the sealing element 85 again take up a position such as is shown in FIG. 2b.

During the motion of the pump diaphragm 30 to its highest position, the left-hand non-return valve 28 opens, the right-hand non-return valve 29 being closed, so that ambient air flows from the surroundings via the ambient air filter 31 into the supply conduit 37, the induction space 47 and, via the left-hand non-return valve opening 104 and the opening 102, into the delivery space 57. During the following opposite motion of the pump diaphragm 30, the left-hand non-return valve 28 closes so that, with the right-hand non-return valve 29 closed, the ambient air enclosed in the delivery space 57 is compressed by the pump spring 65 and, at a positive pressure which can be specified by means of the compression spring 108, flows into the delivery conduit 38 by opening the right-hand non-return valve 29. When the pump diaphragm 30 is moved, the push-rod 60 moves into the recess 118 of the closing element 117, with the compression spring 123 pressing the sealing ring 121 onto its extension 122, so that the shut-off valve 25 shuts off, in a closed position, the delivery conduit 38 from the supply conduit 37. It is only in the lowest position of the pump diaphragm 30, when the electromagnetic valve 6 is not excited, that the push-rod 60 is also located in its lowest position, which opens the shut-off valve 25, the end surface 62 of the pump diaphragm 30 being in contact with the end surface 63 of the guide sleeve 92. The lowest position of the pump diaphragm 30 is always reached when there is no leak test specified by the electronic control unit 34 taking place.

For leak testing, the pump appliance 5 is only activated for a period by the electronic control unit 34 until, after a specified number of pumping motions of the pump diaphragm 30—for example thirty pumping motions—a certain positive pressure has built up in the tank system 1. The electromagnetic valve 6 then remains in the excited condition. In the case of a leak in the tank system 1, the positive pressure present in the tank system 1 decays again and, due to the drop in pressure, the right-hand non-return valve 29 opens and the pump diaphragm 30 is drawn downwards. On reaching the second reed switch 97, shown below the pump diaphragm 30 in FIG. 2b, the pump appliance 5 is again put into operation and, specifically, until such time as the pump diaphragm 30 is again located in the working position between the two reed switches 96 and 97, or until a certain positive pressure is again present in the tank system 1. The time required between the repeated actuation of the pump appliance 5 in order to restore the positive pressure is then a measure of the size of the leak which is occurring.

Figure 4A:
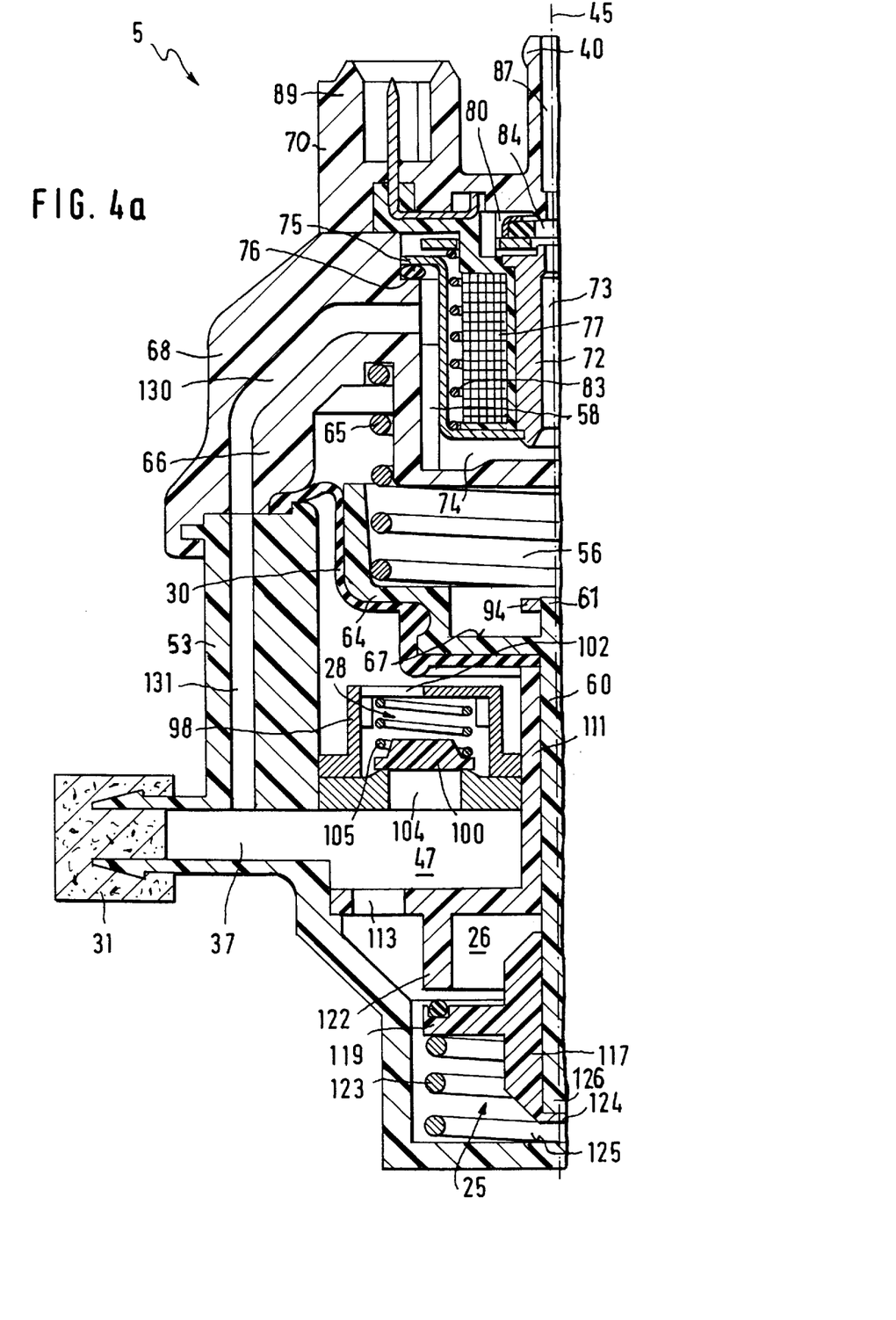
Figure 4B:
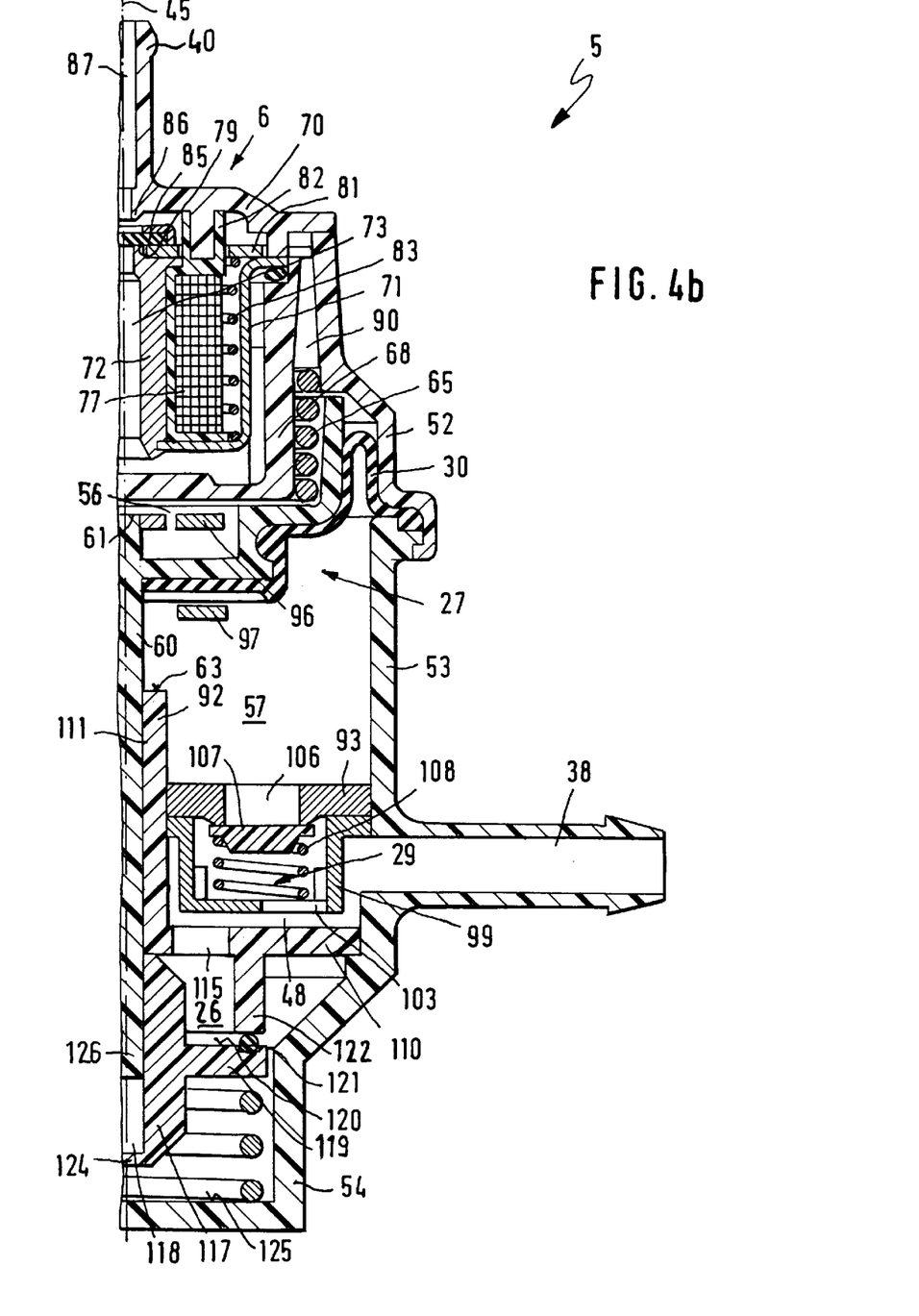

FIG. 4a/4b shows a section through the pump appliance 5 according to the invention and in accordance with a second embodiment example, all parts which are similar or have a similar effect being indicated by the same reference signs as in FIGS. 1, 2a/2b and 3. As a departure from the first embodiment example of FIG. 2a/2b, a two-part flow passage 130, 131 is formed for the ventilation of the electromagnetic valve 6. This flow passage 130, 131 leads within the housing of the pump appliance 5 from the electromagnetic valve 6 to the supply conduit 37 and to the induction space 47, respectively, so that the ambient air induced for ventilating the electromagnetic valve 6 can flow in directly via the ambient air filter 31. Because the ambient air induced for ventilation purposes has already been filtered by the ambient air filter 31, the pump filter 32 in the electromagnetic valve 6 can be omitted. The angled flow passage 130, 131 shown in FIG. 4a can be formed from two partial passages 130 and 131, one partial passage 130 extending in the dome 68 and the other partial passage 131 extending in the lower housing half 53. When the housing is assembled, the partial passages 130 and 131 open into one another at an interface between the dome 68 and the lower housing half 53. Instead of the partial passages 130 and 131, it is also possible to provide appropriately configured annular gap passages which extend radially, at least partially as annuli, in the dome 68 and in the lower housing part 53 and which again open into one another at the interface between the dome 68 and the lower housing half 53 on assembly of the housing 53, 68 in order to form, by this means, a ventilation connection within the housing 53, 68 from the electromagnetic valve 6 to the surroundings.

I claim:

1. A pump appliance for a tank system of an internal combustion engine, having an integrated electromagnetic valve, a pump diaphragm (30), a pump space (56) formed between the electromagnetic valve and the pump diaphragm, a delivery space (57) formed between the pump diaphragm and first and second non-return separately operated valves (28, 29), said delivery space is connected via said first non-return valve (28) and via a supply conduit (37) to ambient air and via said second non-return valve (29) and a delivery conduit (38) to the tank system, a shut-off valve (25) is provided between the supply conduit and the delivery conduit, the pump space is connected with a vacuum source in an excited condition of the electromagnetic valve and to ambient air in an excited condition of the electromagnetic valve and to ambient air in a non-excited condition of the electromagnetic valve so that the pump diaphragm executes an axial pumping motion which is due to alternating pressure relationships in the pump space and by ambient air induced via the first non-return valve (28) into the delivery space (57) and, when the shut-off valve (25) is closed, ambient air induced in the delivery space (57) is delivered via the second non-return valve (29) into the tank system, wherein the electromagnetic valve (6) is directly connected to the surroundings by means of a ventilation opening (42); and a pump filter (32) is provided between the ventilation opening (42) and a valve seat (79) of the electromagnetic valve (6).

2. A pump appliance for a tank system of an internal combustion engine, having an integrated electromagnetic valve, a pump diaphragm (30), a pump space (56) formed between the electromagnetic valve and the pump diaphragm, a delivery space (57) formed between the pump diaphragm, a delivery space (57) formed between the pump diaphragm and first and second non-return separately operated valves (28, 29), said delivery space is connected via said first non-return valve (28) and via a supply conduit (37) to ambient air and via said second non-return valve (29) and a delivery conduit (38) to the tank system, a shut-off valve (25) is provided between the supply conduit and the delivery conduit, the pump space is connected with a vacuum source in an excited condition of the electromagnetic valve and to ambient air in a non-excited condition of the electromagnetic valve so that the pump diaphragm executes an axial pumping motion which is due to alternating pressure relationships in the pump space and by ambient air induced via the first non-return valve (28) into the delivery space (57) and, when the shut-off valve (25) is closed, ambient air induced in the delivery space (57) is delivered via the second non-return valve (29) into the tank system, wherein the electromagnetic valve (6) is directly connected to the surroundings by means of a ventilation opening (42), and the ventilation opening (42) is overlapped by a protruding projection (91) of a cap (70) of the pump appliance (5).

3. The pump appliance as claimed in claim 2, wherein the projection (91) has protrusions (43) extending in a direction towards the ventilation opening (42).

* * * * *